United States Patent [19]

Yamazaki et al.

[11] Patent Number: 5,187,601
[45] Date of Patent: Feb. 16, 1993

[54] METHOD FOR MAKING A HIGH CONTRAST LIQUID CRYSTAL DISPLAY INCLUDING LASER SCRIBING OPAQUE AND TRANSPARENT CONDUCTIVE STRIPS SIMULTANEOUSLY

[75] Inventors: Shunpei Yamazaki, Tokyo; Takeshi Fukada, Ebina; Mitsunori Sakama, Hiratsuka; Nobumitsu Amachi; Naoya Sakamoto, both of Atsugi; Mitsufumi Codama, Atsugishi; Takashi Fuki; Ichiro Takayama, both of Atsugi, all of Japan

[73] Assignee: Semiconductor Energy Laboratory Co., Ltd., Kanagawa, Japan

[21] Appl. No.: 807,748

[22] Filed: Dec. 17, 1991

Related U.S. Application Data

[63] Continuation of Ser. No. 318,540, Mar. 3, 1989, abandoned.

[30] Foreign Application Priority Data

Mar. 7, 1988 [JP] Japan .................................. 63-54466

[51] Int. Cl.$^5$ ............................................ G02F 1/1343
[52] U.S. Cl. ................................................ 359/54; 359/87
[58] Field of Search ...................... 350/336; 359/54, 87

[56] References Cited

U.S. PATENT DOCUMENTS

| 4,747,671 | 5/1988 | Takahashi et al. | 350/336 |
| 4,818,078 | 4/1989 | Mouri et al. | 350/336 |
| 4,824,218 | 4/1989 | Kuno et al. | 350/336 |
| 4,859,036 | 8/1989 | Yamanaka et al. | 350/336 |
| 4,906,072 | 3/1990 | Kaneko et al. | 350/336 |
| 4,906,491 | 3/1990 | Yamazaki | 427/531 |
| 4,931,787 | 6/1990 | Shannon | 350/332 |

Primary Examiner—William L. Sikes
Assistant Examiner—Anita Pellman Gross
Attorney, Agent, or Firm—Sixbey, Friedman, Leedom & Ferguson

[57] ABSTRACT

A method for forming a resistance-reducing electrode pattern in an electrooptical device includes the steps of: forming a transparent conductive film on a substrate; forming a plurality of opaque conductive strips on the film; and scribing the combined structure with a laser through the two layers to simultaneously divide the conductive strips into two parts and pattern the transparent film. In this manner, a pattern of transparent electrodes bordered with an opaque electrode pattern is formed. In specific embodiments, the opaque strips may comprise chromium, and the opaque conductive strips may be formed prior to application of the steps above by laser scribing an applied opaque film layer.

17 Claims, 4 Drawing Sheets

METHOD FOR MAKING A HIGH CONTRAST LIQUID CRYSTAL DISPLAY INCLUDING LASER SCRIBING OPAQUE AND TRANSPARENT CONDUCTIVE STRIPS SIMULTANEOUSLY

This application is a continuation of Ser. No. 07/318,540, filed Mar. 3, 1989, now abandoned.

BACKGROUND OF THE INVENTION

The present invention relates to a method of making liquid crystal displays capable of producing high contrast images.

Liquid crystal displays are representative compact display devices which have been broadly used in many electric appliances. Because liquid crystal materials do not have light emitting ability and are driven by means of a pair of electrodes between which a liquid crystal layer is disposed, electrode arrangements made of a conductive transparent oxide (CTO) material have to be formed over the whole plane of the display area. The resistivities of such CTOs are relatively high, as compared with other conducting materials, for example, not lower than $2 \times 10^{-4}$ ohm centimeter. An increase in electrode thickness decreases the brightness of the display.

SUMMARY OF THE INVENTION

It is an object of the present invention to provide a liquid crystal display capable of producing images having a high brightness and a high contrast ratio.

In order to accomplish the above and other objects, the liquid crystal display in accordance with a preferred embodiment of the present invention is provided with transparent electrodes which are bordered with metal lines. The width of the lines has to be selected in order not to substantially reduce the transmissivity of the pixels defined by the transparent electrodes.

DETAILED DESCRIPTION OF THE PREFERRED EMBODIMENTS

Figure 1:
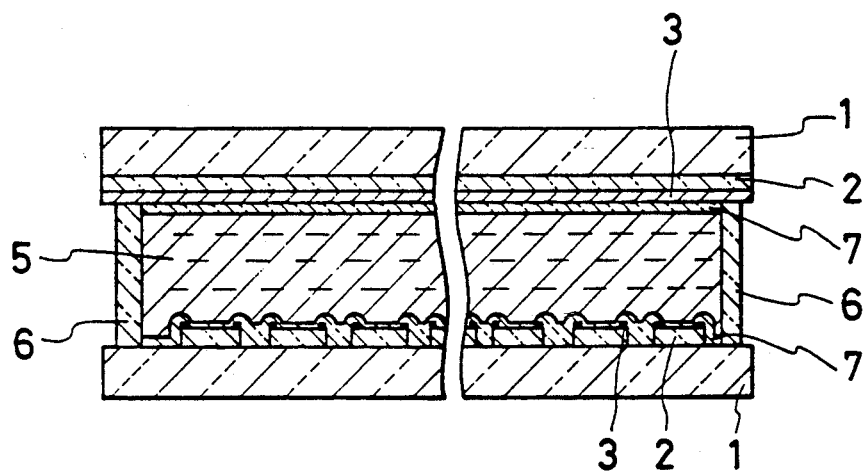
FIG. 1 is a cross sectional view showing a liquid crystal display in accordance with the present invention.

Referring now to FIG. 1, a liquid crystal display is illustrated in accordance with the present invention. The display device comprises a pair of glass substrates 1, electrode arrangements 2 formed on the inside surfaces of the substrates 1 and opposed to each other, orientation control films 7 formed on the inside surfaces of the substrates 1 over the electrode arrangements 2, and a liquid crystal layer 5 of a chiral smectic C or super twisted nematic liquid crystal material. The distance between the substrates 1 is kept constant by means of spacers (not shown). The periphery of the display is provided with a sealing means 6 for avoiding the loss of the liquid crystal material.

Figure 2A:
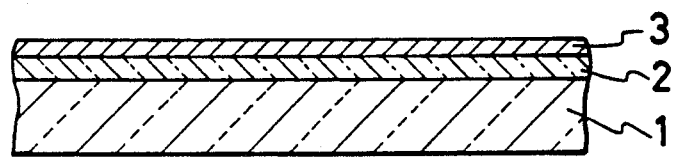
FIGS. 2(A) to 2(C) are cross sectional views showing a procedure for forming an electrode pattern on a glass substrate in accordance with the present invention.

The electrode arrangements 2 are comprised respectively of first parallel electrode strips and second parallel electrode strips extending orthogonally in order to define pixels of 300 microns $\times$ 300 microns therebetween in a matrix consisting of 640 $\times$ 500 dots. Each strip is comprised of a lower transparent conductive film and two metallic lines (opaque electrodes) formed along the edges of the transparent conductive film. The method of forming such an electrode structure is explained in conjunction with FIGS. 2(A) to 2(C) as follows.

Figure 2B:
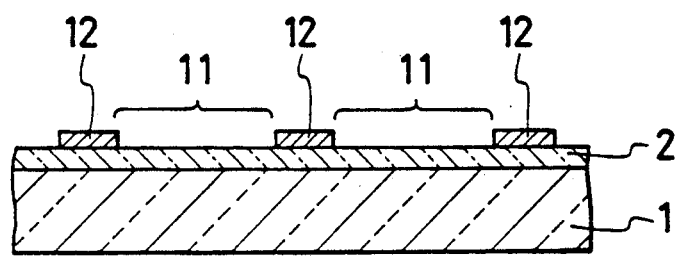
Figure 2C:
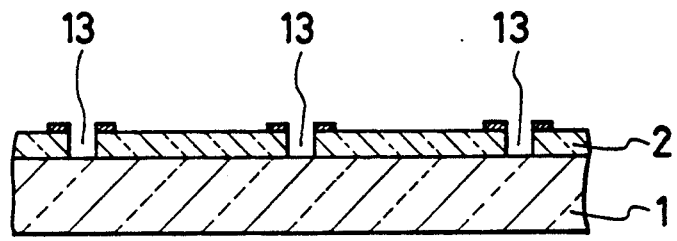
Figure 3:
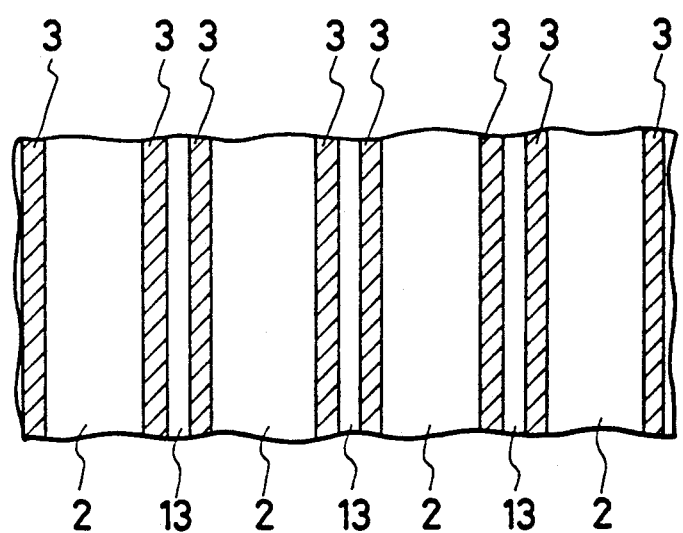
FIG. 3 is a partial plan view of an electrode pattern in accordance with the present invention.

A CTO film 2 made of such as $IN_2O_2$—$SnO_2$ (ITO), $ZnO_2$ or $SnO_2$ is deposited on a glass substrate 1 to a thickness of 500 to 2000 Å, e.g. 1000 Å. The light transmissivity of CTO films is typically 60% or higher at a wavelength of 555 nm. On the ITO film is formed a metallic film 3 such as Cr, Ti, Al, W or Mo film. The thickness of the film 3 is 500 Å for example. Both films 2 and 3 may be formed by sputtering, CVD or evaporation. The metallic film 3 is patterned into a plurality of 30 micrometers wide strips 12 which are separated by intervals 11 of 300 micrometers by laser scribing as shown in FIG. 2(B). Laser rays used for this scribing are generated by a KF excimer laser and shaped by an optical system to have a cross section of 10 microns $\times$ 30 centimeters. The metallic film 3 is irradiated with, and at the same time moved relative to the laser rays in order to remove the metallic material positioned on the intervals 11. Next, the center portion of each metallic strip is removed together with the underlying ITO film in order to form insulating grooves 13 by laser scribing in the same manner as illustrated in FIG. 2(C). The plan view of the structure is shown in FIG. 3.

Alternatively, the formation of the intervals 11 and the grooves 13 can be performed by conventional photolithography using a photoresist and masks. The etchants in this case are $(NH_4)_2Ce(NO_3)_6$ for etching of the metallic (Cr) film 3, and a hydrochloric acid solution of $FeCl_3$ or a mixture of hydrochloric acid and nitric acid for etching of the ITO film 2. After the etching of the metallic film 3, the formation of the grooves 13 may be performed by laser scribing because the etching of the grooves through the two films requires both of the two types of etchants.

Figure 4A:
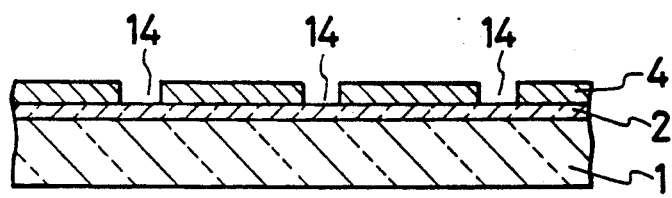
FIGS. 4(A) to 4(D) are cross sectional views showing another procedure for forming an electrode pattern on a glass substrate in accordance with the present invention.
Figure 4B:
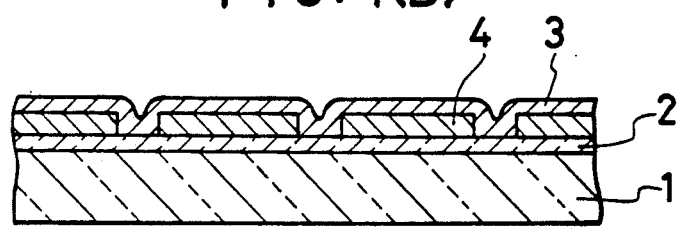
Figure 4C:
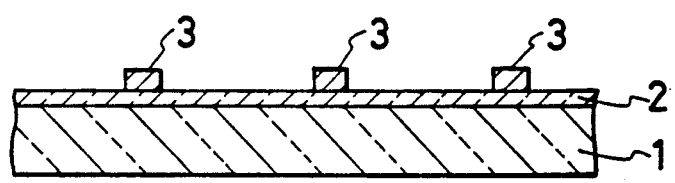
Figure 4D:
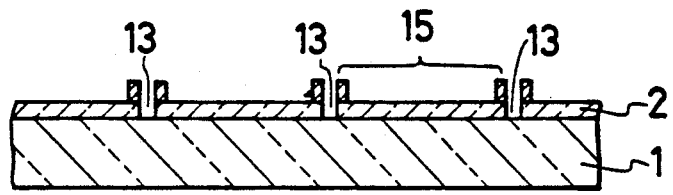

FIGS. 4(A) to 4(D) illustrates another embodiment of the present invention. After depositing an ITO film 2 on a glass substrate 1, there is formed a photoresist pattern consisting of a plurality of 300 micrometers wide strips which are separated by grooves 14 of 30 microns width. A Cr film 3 is coated over the structure. The portions of the Cr film positioned just above the photoresist strips are removed by "lift-off" when the photoresist 4 is removed with a solvent. As a result, the structure shown in FIG. 4(C) is obtained. Then, grooves 13 are formed by laser scribing using 5–10 microns $\times$ 30 cm laser beams in the same manner as in the previous embodiment.

In order to form the grooves 13, the removal of the ITO material together with the overlying metallic material by laser scribing is particularly advantageous. When the ITO film is scribed alone without the overlying strips, projections of 2–10 microns height are formed at the edges of the ITO strip during the formation of the grooves by laser scribing. Namely, the process for eliminating the projection can be dispensed with in accordance with this procedure.

The resistivity of ITO is typically 2.0 to $5.0 \times 10^{-4}$ ohm centimeter. The sheet resistance of the ITO strips is 30 ohm/cm$^2$ in case that the resistivity of the ITO is $3.0 \times 10^{-4}$ ohm centimeter. Then, the resistance measured between the ends of one ITO strip of 240 mm is 22 kilo ohm. By providing the metallic lines of Cr in accordance with the present invention, this resistance can be reduced to 12 to 13 kilo ohm. If the metallic lines are formed from Ti, Al or W, the resistance can be further reduced to the order of 1/10 of the conventional level.

By arranging, in orthogonal relation, two glass substrates 7 with electrode arrangements thereon, a plurality of pixels are defined at the intersections. It will be noted that each pixel is bordered with the metallic lines, and therefore the contrast is improved.

While several embodiments have been specifically described, it is to be appreciated that the present invention is not limited to the particular examples described and that modifications and variations can be made without departure from the scope of the invention as defined by the append claims. For example, although the embodiments are of the transmission mode, the present invention can be applied also for the reflection mode. In this case, one of the glass substrates 1 can be replaced with an opaque substrate, and usual metallic strips (reflective) are employed as the electrode arrangement thereon instead of the composite electrode structure of the present invention.

We claim:

1. A method for forming an electrode pattern for an electro-optical device, said electrode pattern comprising a plurality of transparent conductive strips, on each of which is provided with an opaque conductive material at its edge portions, said method comprising the steps of:
forming a transparent conductive film on a substrate;
forming a plurality of opaque conductive strips on said transparent conductive film;
laser scribing a portion of said opaque conductive strips in order to divide each of the opaque conductive strips into two parts, wherein said transparent conductive film is patterned into said plurality of transparent conductive strips by said laser scribing simultaneously with said opaque conductive strips.

2. The method of claim 1 wherein said laser scribing is implemented with an excimer laser.

3. The method of claim 1 wherein said transparent conductive film comprises a material selected from the group consisting of indium tin oxide, tin oxide and zinc oxide.

4. The method of claim 1 wherein said opaque conductive strips comprises a metal selected from the group consisting of CR, Ti, Al, W and Mo.

5. The method of claim 1 wherein the width of said opaque conductive strips before the laser scribing step is about 30 $\mu$m.

6. The method of claim 1 wherein said opaque conductive strips are formed by a lift-off method.

7. The method of claim 1 wherein the thickness of said transparent conductive film is 500–2000 Å.

8. A method for forming an electrode pattern for an electro-optical device, said electrode pattern comprising a plurality of transparent conductive strips, on each of which is provided with chromium at its edge portions, said method comprising the steps of:
forming a transparent conductive film on a substrate;
forming a plurality of opaque conductive strips comprising chromium on said transparent conductive film;
laser scribing a portion of said opaque conductive strips in order to divide each of the opaque conductive strips into two parts, wherein said transparent conductive film is patterned into said plurality of transparent conductive strips by said laser scribing simultaneously with said opaque conductive strips.

9. The method of claim 8 wherein said laser scribing is implemented with an excimer laser.

10. The method of claim 8 wherein said transparent conductive film comprises a material selected from the group consisting of indium tin oxide, tin oxide and zinc oxide.

11. The method of claim 8 wherein the width of said opaque conductive strips before the laser scribing step is about 30 $\mu$m.

12. The method of claim 8 wherein said opaque conductive strips are formed by a lift-off method.

13. A method for forming an electrode pattern for an electro-optical device, said electrode pattern comprising a plurality of transparent conductive strips, on each of which is provided with an opaque conductive material at its side edges, said method comprising the steps of:
forming an opaque conductive film on said transparent conductive film;
patterning said opaque conductive film by a first laser scribing into a plurality of opaque conductive strips;
patterning said opaque conductive strips by a second laser scribing in order to divide each of the opaque conductive strips into two parts, wherein said transparent conductive film is patterned into said plurality of transparent conductive strips by said second laser scribing simultaneously with said opaque conductive strips.

14. The method of claim 13 wherein said first and second laser scribing is implemented with an excimer laser.

15. The method of claim 13 wherein said transparent conductive film comprises a material selected from the group consisting of indium tin oxide, tin oxide and zinc oxide.

16. The method of claim 13 wherein said opaque conductive strips comprises a metal selected from the group consisting of Cr, Ti, Al, W and Mo.

17. The method of claim 13 wherein the width of said opaque conductive strips before the second laser scribing step is about 30 $\mu$m.

* * * * *